United States Patent [19]

Suzuki et al.

[11] Patent Number: 4,545,021

[45] Date of Patent: Oct. 1, 1985

[54] METHOD OF CORRECTING UNBALANCE OF A ROTATING BODY

[75] Inventors: Masaki Suzuki, Hirakata; Mikio Hasegawa, Kadoma, both of Japan

[73] Assignee: Matsushita Electric Industrial Company, Ltd., Osaka, Japan

[21] Appl. No.: 319,996

[22] Filed: Nov. 10, 1981

[30] Foreign Application Priority Data

Nov. 11, 1980 [JP] Japan ................. 55-159271

[51] Int. Cl.$^4$ .................. G01M 1/38; G01M 1/16; G01M 1/00
[52] U.S. Cl. ..................... 364/571; 73/457; 73/460; 73/461; 73/462; 364/463
[58] Field of Search ............. 364/463, 475, 508, 571, 364/474; 73/65, 66, 457, 460–462

[56] References Cited

U.S. PATENT DOCUMENTS

| | | | |
|---|---|---|---|
| 2,954,711 | 10/1960 | Hack | 408/1 R |
| 4,098,127 | 7/1978 | Shiga et al. | 73/462 |
| 4,109,312 | 8/1978 | Beutel | 73/462 |
| 4,170,896 | 10/1979 | Kurkosz | 73/66 |
| 4,182,185 | 1/1980 | Forster | 364/463 |
| 4,193,304 | 3/1980 | Hofmann | 73/462 |
| 4,277,976 | 7/1981 | Mueller et al. | 73/462 |
| 4,357,832 | 11/1982 | Blackburn et al. | 73/462 |

FOREIGN PATENT DOCUMENTS

| | | |
|---|---|---|
| 2705217 | 9/1977 | Fed. Rep. of Germany . |
| 2754992 | 12/1977 | Fed. Rep. of Germany ........ 73/462 |
| 2823219 | 12/1979 | Fed. Rep. of Germany ........ 73/462 |
| 1067047 | 4/1967 | United Kingdom . |

*Primary Examiner*—Errol A. Krass
*Assistant Examiner*—Edward R. Cosimano
*Attorney, Agent, or Firm*—Lowe, King, Price & Becker

[57] ABSTRACT

Dynamic unbalance of a rigid rotor is corrected by machining the rotor in a direction parallel to the rotor axis of said rotor by subtracting or adding weights corresponding to a corrective weight in two planes for compensating initial unbalanced vectors corresponding to correction angle directions and corrective weights in the planes. Prior to effecting the machining, center of gravity position of a corrective machining weight is calculated for effecting corrective machining in the axial direction; the corrective machining corresponds to the corrective weight. The initial unbalanced vectors in the two planes are corrected into unbalanced vectors in new planes respectively including the centers of gravities of the corrective machining weights determined during the calculating step. Correction angular positions and corrective machining weights around the respective planes are obtained by repeating the calculating and correcting steps.

6 Claims, 12 Drawing Figures

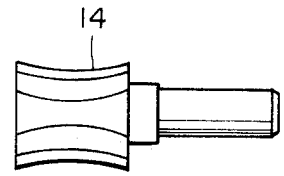
FIG. 4
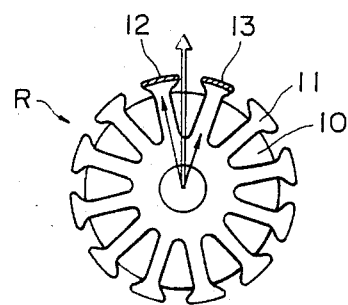
FIG. 5
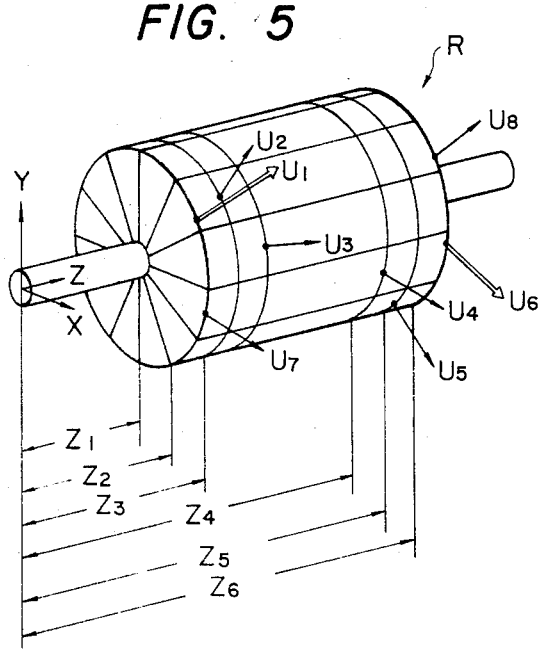

METHOD OF CORRECTING UNBALANCE OF A ROTATING BODY

BACKGROUND OF THE INVENTION

The present invention relates generally to a method of correcting unbalance of a rotor of an electric motor or the like and more particularly to a method wherein dynamic unbalance of a rotor is corrected by either adding or subtracting corrective weights by machining the rotor in an axial direction thereof.

A conventional method of determining or modifying a corrective weight of a measured unbalanced weight of a rotor involves making a hole or holes in a radial direction of the rotor. Since the depth of a drill cutting such a hole is not proportional to the corrected mass achieved thereby, the corrective mass must be corrected or modified.

Some rotors have a structure which is not easily drilled in the radial direction because the rotors have a laminated core. In such a case, it is necessary to correct unbalance by machining the rotor with a milling cutter or drill fed in a direction parallel to the rotor axis. In such a case, however, residual unbalance is still apt to occur because there is a deviation in the center of gravity resulting from removal of weight from a correcting plane. The occurrence of the residual unbalance is known as a correcting plane. The correcting plane is generally located in the vicinity of one end of the rotor. The correcting plane error of course affects the corrected mass of the plane in proximity to said one end of the rotor. In addition, the correcting plane error affects another correcting plane, located in the vicinity of the other end of the rotor. Thereby, recorrection of the corrective masses in both of the correcting planes has been thought to be impossible.

In the prior art techniques, the correcting plane errors are avoided by making the corrective machining length in the direction of the rotor axis as small as possible. In the prior art milling machine method the removing weight center of gravity is always at the same position. If the distance between two correcting planes is very small, the ratio between the unbalanced weight, after correction, and the initial unbalanced weight is only ½ to ¼. Therefore, to obtain the necessary dynamic balance it has been previously necessary to repeat the measurements and corrections several times, for either automatic or manual correction. Thereby, the prior art method for balancing a rotor requires a long time; the costs to perform the balancing operation and the equipment therefor are high.

SUMMARY OF THE INVENTION

The present invention has been developed to remove the above-mentioned disadvantages and drawbacks inherent in the prior art method of correcting dynamic unbalance of a rotor.

It is, therefore, an object of the present invention to provide a new and improved method of correcting dynamic unbalance of a rotor so that dynamic balance can be obtained with a one-time machining operation, thereby reducing the cost of performing the operation, as well as the cost of the balancing machinery.

According to a feature of the present invention, information or data concerning the initial unbalance weight is processed in a computer so that necessary corrective machining data are obtained by performing simulation.

In accordance with another feature of the invention, a method of correcting dynamic unbalance of a rotor is achieved by either adding or subtracting corrective weights by machining the rotor in an axial directioon thereof. The rotor has an unbalanced weight with respect to an axis in the axial direction. In accordance with one aspect of the invention, the method comprises:

(a) determining correcting positions and values for corrective machining weights in accordance with information relating to initial unbalanced weights in two predetermined correcting spaced apart parallel planes of the rotor; the planes are normal to the axial direction;

(b) calculating the center of gravity position of each corrective machining weight by using the determined correcting positions and the determined corrective machining weights;

(c) calculating the values of residual unbalanced weights which are located in the axial direction by using the determined correcting positions and the determined corrective machining weights;

(d) detecting whether or not one or both of the calculated residual weights is within a given range;

(e) calculating machining feed strokes respectively corresponding to the unbalanced weights only if one or both of the residual unbalanced weights is detected in step (d) to be within the given range;

(f) if one or both of the residual unbalanced weights is detected in step (d) to be out of the given range, steps (a)-(e) are repeated such that step (a) is executed by using new values for the initial unbalanced weights; the new values are obtained from the residual unbalanced weight and the initial unbalanced weights; and (g) machining the rotor to correct the dynamic unbalanced weight in accordance with the machining weights obtained from step (e) and from the correcting positions obtained in step (a).

In further detail, step (f) is performed by repeating steps (a)-(e) such that step (a) is executed by using newly set values for the initial unbalanced weights. The newly set initial unbalanced weights are obtained by assuming two new correcting planes, each including the location of the center of gravity obtained in step (b) and by calculating information relating to the unbalance in the assumed planes for information relating to the location of the center of gravity of the corrective machining weights and from the initial unbalanced weights. The information relating to unbalance at the assumed planes is converted into information relating to the newly set initial unbalanced weights.

BRIEF DESCRIPTION OF THE DRAWINGS

The objects and features of the invention will become more readily apparent from the following detailed description of the preferred embodiments taken in conjunction with the accompanying drawing, wherein:

FIG. 4 includes schematic side and end views of an electric motor rotor corrected in accordance with the method of the present invention;

FIG. 5 is a schematic perspective view of the rotor of FIG. 4, wherein various vectors used in the calculation method of FIG. 3 are illustrated;

DETAILED DESCRIPTION OF THE INVENTION

Prior to describing the preferred embodiments of the present invention, the above-mentioned conventional method is discussed in detail to provide a better understanding of the present invention.

Figure 9:
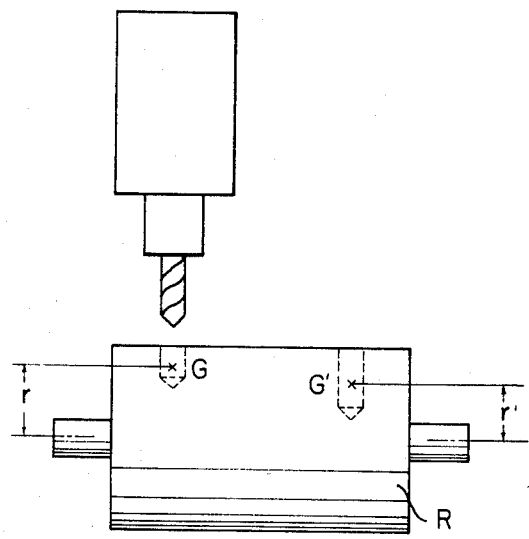
FIG. 9 is a view of a conventional correcting method using a radially extending drill.

In FIG. 9 is illustrated a conventional, prior art method of correcting the unbalance of rotor R by making holes in the radial direction of the rotor. The holes are formed as cylinders G and G', respectively located adjacent opposite faces of the rotor. Cylindrical bores G and G' have centers of gravity removed from the axis of rotor R by radii r and r', respectively. Cylindrical bores G and G' are formed in rotor R by drilling radially into the rotor, as indicated in FIG. 9.

Figure 10:
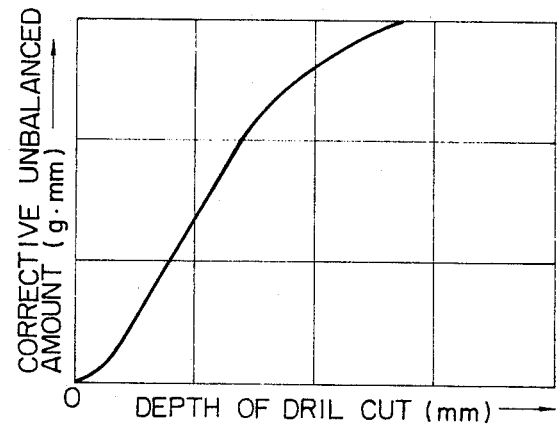
FIG. 10 is a graphical representation of the relationship between the depth of drill cutting in the conventional method of FIG. 9 and the corrective unbalanced weight.

FIG. 10 is a graphical representation of unbalance corrective weight with respect to the depth of the cylinders cut by the drill of FIG. 9 in rotor R. From the curve of FIG. 10, it is understood that the unbalance corrective weight is not proportional to the depth of the drill cut forming cylinders G and G' in the radial direction of rotor R. Instead, the depth of drill cut versus corrective weight is a non-linear function.

Figure 1:
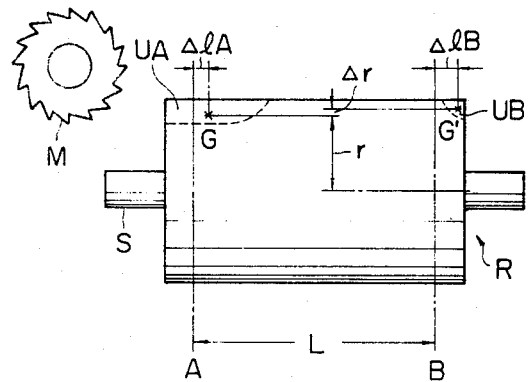
FIGS. 1 and 2 are respectively viws of a rotor being machined by a milling cutter and a drill for correcting dynamic unbalance in accordance with a prior art technique and the present invention.
Figure 2:
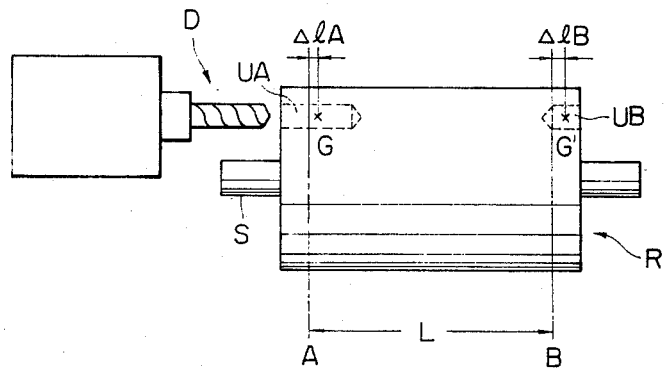

In FIGS. 1 and 2 are respectively shown other conventional, prior art methods for correcting the unbalance of rotor R. In FIG. 1, mill M cuts slots UA and UB in opposite end faces of rotor R. In FIG. 2, drill D cuts cylindrical bores UA and UB in opposite faces of rotor R. In each of FIGS. 1 and 2 axially spaced correcting planes A and B, normal to the axis of rotor R, are provided in proximity to opposite end faces of the rotor. Correcting planes A and B are spaced from each other by a distance L. The slots UA and UB of FIG. 1 and cylindrical bores UA and UB of FIG. 2 represent the values of weights corresponding to the weight of the material removed from rotor R by the machining processes involving milling or drilling. Mill M and drill D are axially directed into rotor R, in a direction parallel to the axis of the rotor. The axis of rotor R is coincident with the center of shaft S. Removed slot UA of FIG. 1 and removed cylindrical bore UA of FIG. 2 have centers of gravity G, both spaced from correcting plane A by distance $\Delta lA$. Removed slot UB of FIG. 1 and removed cylindrical bore UB of FIG. 2 have centers of gravity G', both removed from correcting plane B by a distance $\Delta lB$. It is preferable for the values of $\Delta lA$ and $\Delta lB$ to be zero, i.e. the centers of gravity of the removed slots and cylindrical bores of FIGS. 1 and 2 should be in correcting planes A and B. However, the locations of the centers of gravity G and G' are apt to deviate from correcting planes A and B due to errors. Assuming that there is a finite difference between center of gravity G and correcting plane A, there is a residual unbalance of $(\Delta lA/L)UA$ in left correcting plane A; there is a residual unbalance of $-(\Delta lA/L)UA$ in the right correcting plane as a result of the deviation of center of gravity G from correcting plane A. In a similar manner, there are residual unbalances in the left and right correcting planes A and B resulting from a finite deviation of center of gravity G' from correcting plane B. Such residual unbalance is known as a correcting plane error. Because there is a reciprocal and cooperative relationship between the correcting plane errors in planes A and B in response to finite values of $\Delta lA$ and $\Delta lB$, it has been impossible previously to recorrect the corrective weights if there is an error.

Figure 11:
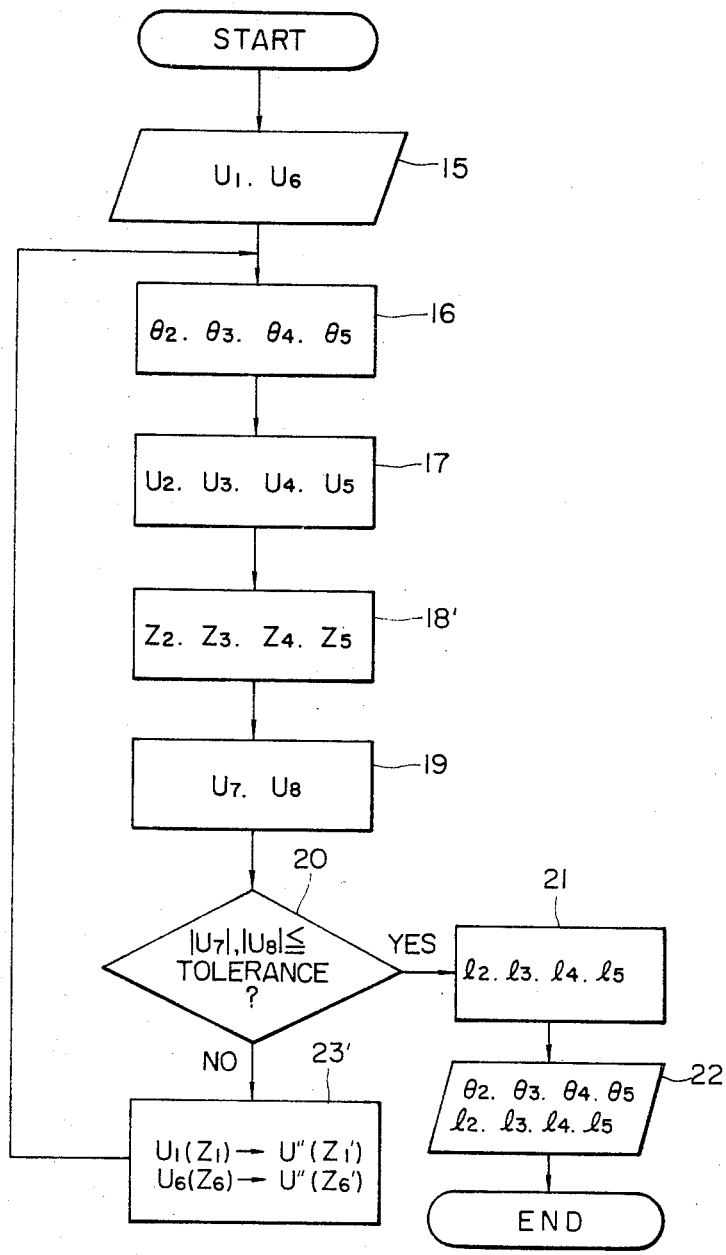
FIG. 11 is a flow chart of another embodiment of the operating steps for performing the method according to the present invention.
Figure 12:
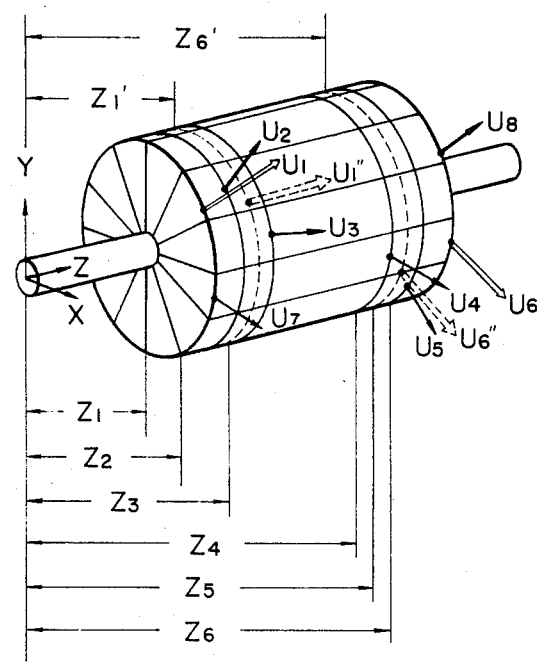
FIG. 12 is a schematic perspective view of the rotor of FIG. 4, wherein various vectors used in the calculation method of FIG. 11 are illustrated.

In accordance with the present invention, it is possible to obtain a dynamically balanced rotor by using the process of FIGS. 3-8, or the modified process of FIGS. 11 and 12.

Figure 3:
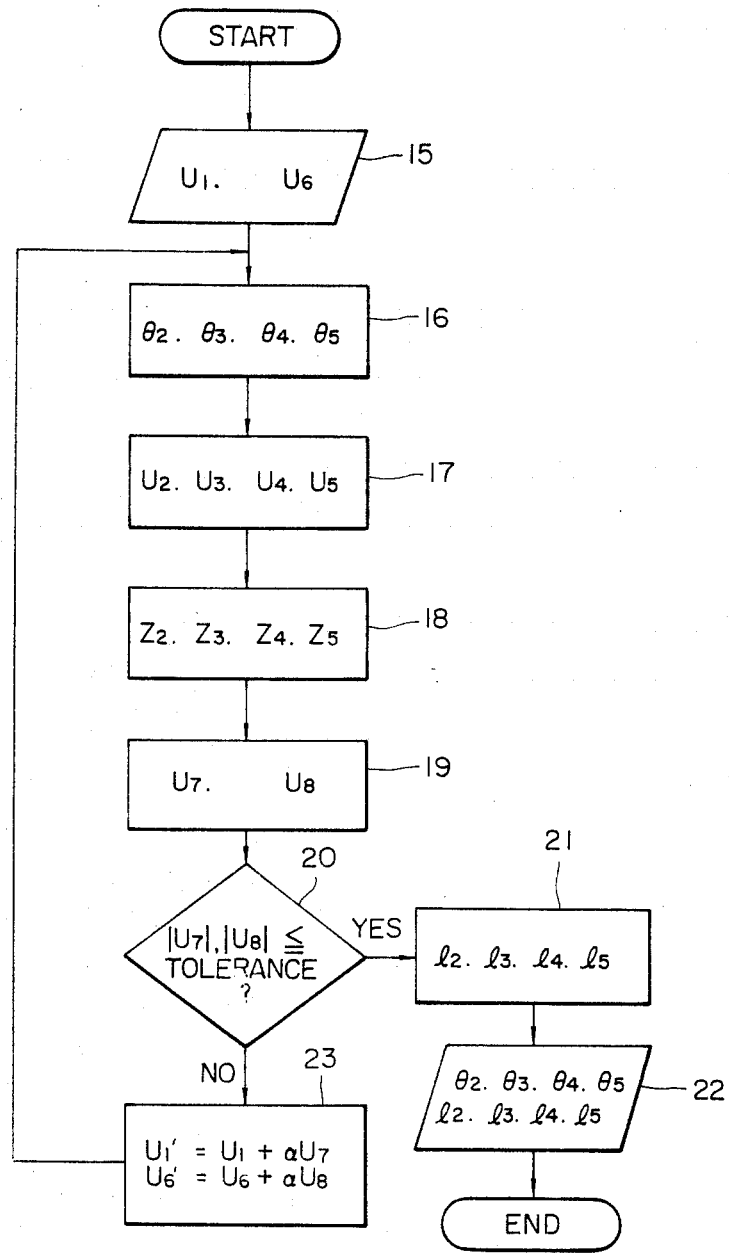
FIG. 3 is a flow chart of the operating steps for performing the method according to one embodiment of the present invention.
Figure 6:
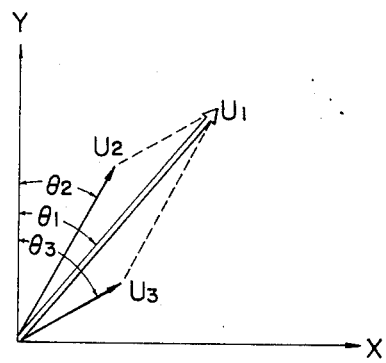
FIG. 6 is a vector diagram of a calculating process according to the present invention.

FIG. 3 is a flow chart of the computer processes used for performing the method of the present invention. In FIG. 4 is illustrated rotor R which is to be balanced in accordance with the invention. In a preferred embodiment, rotor R is a small commutator motor rotor including core 11 having twelve slots 10, radially extending from the rotor axis. Dynamic unbalance of rotor R is corrected by cutting away the outer periphery of the rotor by using drum-shaped milling cutter 14 which is applied to the rotor in a direction parallel to the rotor axis. In the illustrated example, two peripheral portions 12 and 13 are simultaneously machined. The number of peripheral portions to be machined is changed in accordance with the width of milling cutter 14. The periphery of drum-shaped milling cutter 14 has a concave shape relative to the periphery of core 11, as illustrated in FIG. 4.

FIG. 5 is a vector diagram of a balancing process performed on rotor R of FIG. 4. Initial unbalance vectors U1 and U6 subsist in opposite end faces $Z_1$ and $Z_6$ of rotor R. Unbalance vectors U1 and U6 extend radially from rotor R at different angular positions relative to the rotor axis and usually have different amplitudes. To compensate for unbalance vectors $U_1$ and $U_6$, radially extending vectors $U_2$, $U_3$, $U_4$ and $U_5$ are respective provided in planes $Z_2$, $Z_3$, $Z_4$ and $Z_5$, which subsist between planes $Z_1$ and $Z_6$ within rotor R. Generally, radially extending vectors $U_2$-$U_5$ have different amplitudes and directions. Correcting planes $Z_2$-$Z_5$ define the center of gravity of the corresponding corrective weights $Z_2$-$Z_5$. There are residual unbalance vectors $U_7$ and $U_8$ in planes $Z_1$ and $Z_6$. Each of planes $Z_1$-$Z_6$ is transverse to the axis of rotor R.

Reference is now made to FIG. 3 of the drawing, a flow diagram of a computer program used to determine the magnitude, direction and plane of vectors $U_2$-$U_5$, as well as the magnitude of the residual correcting vectors $U_7$ and $U_8$. After the program of FIG. 3 has been entered, the values of initial unbalanced weights $U_1$ and $U_6$ are entered into the program during step 15. The initial unbalanced weights $U_1$ and $U_6$ are measured by a conventional dynamic balance tester. Each of the unbalanced weights $U_1$ and $U_6$ is expressed as an unbalanced weight value $u_1$ and $u_6$, in grams, and as a direction $\theta_1$ and $\theta_6$, in degrees. Masses corresponding to the values of the unbalanced weights $U_1$ and $U_6$ are to be removed from rotor R.

After the values of the initial unbalanced weights $U_1$ and $U_6$ have been entered, the program advances to step 16, wherein the directions of the corrective angles for vectors $U_2$-$U_5$ are determined. The directions $\theta_2$-$\theta_5$ of vectors $U_2$-$U_5$ are expressed in degrees. The directions $\theta_2$ and $\theta_3$ of corrective vectors $U_2$ and $ZU_3$ are determined in such a manner that the following relationship is satisfied:

$$\theta_2 \leq \theta_1 < \theta_3 = \theta_2 + 30°$$

wherein $\theta_2 = 0°, 30°, 60° \ldots 330°$

The directions $\theta_4$ and $\theta_5$ for corrective vectors $U_4$ and $U_5$ for correcting the initial unbalance vector $U_6$ are determined in the same manner as described for the determination of the angles $\theta_2$ and $\theta_3$.

The program then progresses to step 17 wherein the magnitudes $u_2$-$u_5$, in grams, are determined for corrective vectors $U_2$-$U_5$. The corrective vectors $U_2$ and $U_3$ for initial unbalanced vector $U_1$ are determined by a static balancing condition in plane $Z_1$ without considering the effects of center of gravity shifting. In particular, the values of weights $u_2$ and $u_3$ are respectively determined by:

$$u_2 = \frac{\sin(\theta_3 - \theta_1)}{\sin(\theta_3 - \theta_2)} u_1$$

$$u_3 = \frac{\sin(\theta_1 - \theta_2)}{\sin(\theta_3 - \theta_2)} u_1$$

The magnitudes $u_4$ and $u_5$ of corrective vectors $U_4$ and $U_5$ for the initial unbalanced vector $U_6$ are calculated in a similar manner, as follows:

$$u_4 = \frac{\sin(\theta_5 - \theta_6)}{\sin(\theta_5 - \theta_4)} u_6$$

$$u_5 = \frac{\sin(\theta_6 - \theta_4)}{\sin(\theta_5 - \theta_4)} u_6$$

Next, the computer advances to step 18, wherein the axial positions $Z_2$-$Z_5$ of vectors $U_2$-$U_5$ are calculated. The calculated values of $Z_2$-$Z_5$ are used to determine the center of gravity location of the portion of rotor R to be removed from end face $E_1$. Thus, the distance $Z_0$ between end face $E_1$ of rotor R and center of gravity G, FIG. 7, of the portion to be removed from end face $E_1$ is determined. Thwe determination is made in connection with the magnitudes of weights $u_2$-$u_5$ that are to be removed from planes $Z_2$-$Z_5$. The position of each center of gravity $Z_2$-$Z_5$ is obtained based on an assumption that rotor R has been machined or cut to remove a corrective weight $u_2$, $u_3$, $u_4$ or $u_5$. The distance between end face $E_1$ and the center of gravity $G_2$ of removed weight $u_2$ is expressed in terms of distance $Z_{02}$. In a like manner, distances $Z_{03}$-$Z_{05}$ between end face $E_1$ and centers of gravity $G_3$, $G_4$ and $G_5$ associated with removing weights $u_3$, $u_4$ and $u_5$ are obtained. From the determined distances $Z_{02}$-$Z_{05}$, the Z ordinates of the working points for the corrective vectors $U_2$-$U_5$ are obtained by the computer as follows:

$$Z_2 = Z_1 + Z_{02}, \; Z_3 = Z_1 + Z_{03}$$

$$Z_4 = Z_6 - Z_{04}, \; Z_5 = Z_6 Z_{05}$$

Because it is difficult directly to obtain the positions $Z_0$ of the centers of gravity from the removing weights u and the calculation thereof requires a considerable amount of time, the value of position $Z_0$ is approximated. In particular, a plurality of corrective weights u corresponding to plural machining or cutting lengths l (FIG. 7) and a plurality of distances $Z_0$ for the position of the centers of gravity of the removed portions are estimated in advance. Then curves obtained from the estimated data are plotted on a graph, the type illustrated in FIG. 8. From the graph of FIG. 8, the corrective machining weight and the center of gravity location are respectively expressed by polynominal approximations expressed in terms of $l = f(u)$. The values of $Z_0$ are obtained by substituting the values of u into these formulae. Alternatively, the values of the magnitudes of weights u are divided into plural sections, each represented by a corresponding formula wherein the values of u are substituted to find the values of $Z_0$.

The computer then progresses to step 19, wherein the residual unbalanced vectors $U_7$ and $U_8$ are calculated. The residual unbalanced vectors $U_7$ and $U_8$ represent unbalanced vectos which subsist when the corrective machining is made in accordance with the data determined by steps 16, 17 and 18. The magnitudes and directions for vectors $U_7$ and $U_8$ are derived from a dynamic balance formula. The condition for rotor dynamic balance shown in FIG. 5 requires fulfillment of the following two Equations, representing the residual unbalanced vecotrs $U_7$ and $U_8$.

Resultant unbalance $= U_1 - U_2 - U_3 - U_4 - U_5 + U_6 - U_7 - U_8 = 0$

Resultant moment $= Z_1 U_1 - Z_2 U_2 - Z_3 U_3 - Z_4 U_4 - Z_5 U_5 + Z_6 U_6 - Z_1 U_7 - Z_6 U_8 = 0$ From the above formula for resultant unbalance, a relationship of $U_7 = -U_8$ is derived. By substituting $U_7 = -U_8$ into the formulat for resultant moment, the value of vector $U_8$ is as follows:

$$U_8 = \frac{1}{Z_6 - Z_1}(Z_1 U_2 - Z_2 U_2 - Z_3 U_3 - Z_4 U_4 - Z_5 U_5 + Z_6 U_6)$$

Thus, the residual unbalanced weights $U_7$ and $U_8$ are obtained from these operations. In actual vector calculation, the vector components of $U_7$ and $U_8$ are divided into x and y components. To obtain the residual unbalanced amounts, actually measured initial unbalanced weights are used as the values of $U_1$ and $U_6$. Namely, substituted values $U'_1$ and $U'_6$ obtained in a new-initial unbalanced weights determining step 23, FIG. 3, are now used for these values.

The program then proceeds to step 20 wherein a determination is made as to whether the absolute values $|U_7|$ and $|U_8|$ of the residual unbalanced weights $U_7$ and $U_8$ are smaller than the accepted tolerances therefor. If the absolute values $|U_7|$ and $|U_8|$ are within the tolerances, the computer proceeds to step 21 wherein the length of the machined slot or drilled cylinder is calculated. Step 21 can be taken at this time because the unbalanced weights $U_7$ and $U_8$ have magnitudes that are negligibly small. In step 21, machining lengths $l_2$, $l_3$, $l_4$ and $l_5$, respectively corresponding to corrective weights $u_2$–$u_5$, are calculated from the formula $l = f(u)$, described in connection with step 18 for calculating the center of gravity position. After the computer has performed step 21, the determined values for $\theta_2$–$\theta_5$ and $l_2$–$l_5$ are readout from the computer as machining data.

If the determination during step 20 indicates that either of the residual unbalanced weights vectors $U_7$ or $U_8$ has a magnitude that is outside of the tolerance therefor, the computer advances to step 23. During step 23, the computer determines new initial unbalanced weights $U'_1$ and $U'_6$. The values of $U'_1$ and $U'_6$ are determined by adding the previously determined residual unbalanced magnitudes $U_7$ and $U_8$ to the initial unbalanced weights $U_1$ and $U_6$ in accordance with:

$$U'_1 = U_1 + \alpha U_7$$

$$U'_6 = U_6 + \alpha U_8$$

The values of $\alpha$ used in determining the values of $U'_1$ and $U'_6$ is a constant which increases the rate of convergence of the solution. The values $U'_1$ and $U'_6$ obtained during step 26 are returned to correction angle determining step 16 and are used during the next iteration in place of the initially selected values for $U_1$ and $U_6$. Steps 16–20 are then repeated in the same manner as described above using the new values of $U'_1$ and $U'_6$. The calculations in steps 16–19 are repeated until an accepted tolerance is determined in step 20. As a result, machining data satisfying the condition of step 20 are finally derived by the computer during a readout step 22.

In the embodiment described in connection with FIG. 5, correcting planes $Z_1$ and $Z_6$ are respectively at end faces $E_1$ and $E_2$ of rotor R. It is to be understood, however, that the corrected planes may be set arbitrarily and need not be the end faces of rotor R. In addition, while the dynamic unbalanced correction has been described to provide perfect correction in two planes, it is possible purposely to leave a given amount of residual unbalance by adjusting the amount of corrective machining, if desired.

According to a second embodiment, the two formulae relating to the balancing condition, described in connection with the residual unbalanced weight calculating step 19, FIG. 3, are not used. In particular, residual unbalanced weights in planes A and B of FIG. 1 are obtained by relying upon the fact that the corrective weight UA in plane A results in the residual unbalances of $(\Delta lA/L)UA$ and $-(\Delta lB/L)UA$ in planes A and B, while the corrective weight UB in plane B results in residual unbalances of $-(\Delta lB/L)UB$ and $(\Delta lB/L)UB$ in planes A and B in accordance with:

$$UA' = UA + \frac{\Delta lA}{L} UA - \frac{\Delta lB}{L} UB$$

$$UB' = UB - \frac{\Delta lA}{L} UB + \frac{\Delta lB}{L} UB$$

Therefore, by performing corrective machining corresponding to $U'A$ and $U'B$ instead of the corrective machining corresponding to UA and UB it is possible to modify the corrective machining weight. This substantially corresponds to reexecuting the calculating process for the residual unbalance once.

Figure 7:
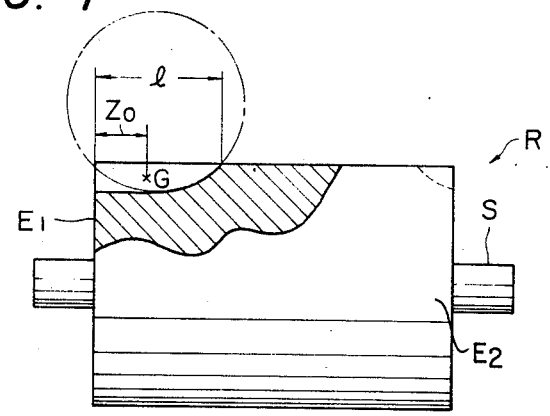
FIG. 7 is a partial cross-sectional view of the rotor of FIGS. 4 and 5, wherein a machining method using a milling cutter is illustrated.
Figure 8:
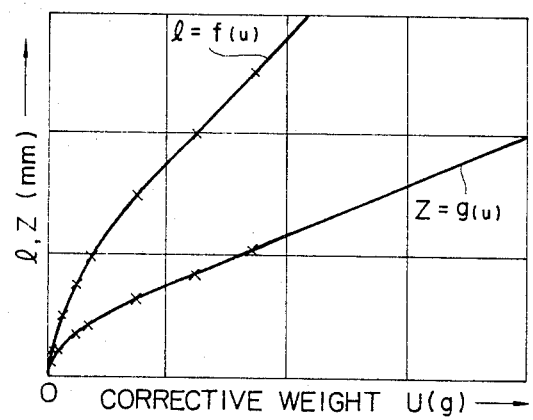
FIG. 8 is a graphical representation of the relationship between corrective weight and machining length and between corrective weight and center of gravity position of a portion removed from a rotor.

Although the described embodiment is in connection with a situation involving two components of force of each correcting plane having a corrective machining position, similar calculating processes may be applied to other cases. For example, the corrective machining direction is not limited. The invention also can involve a situation where no component of force is required or a case where more than two force components are required. In the first described embodiment, the center of gravity of the corrected weight portion is shifted in the direction of the rotor axis, Z, by using a milling cutter machining process, as shown in FIG. 7. It is noted that the slight shifting $\Delta r$ of the center of gravity in the radial direction, FIG. 1, has been ignored. However, the value of $\Delta r$ may be obtained by adding a calculation to step 18, FIG. 3, so that the value of $\Delta r$ may be included by using the component $(1 + \Delta r/r)u$ in place of the magnitude of u in the step of calculating the residual unbalanced weights.

A further embodiment of the invention is described with reference to FIG. 11 and 12. In the flowchart of FIG. 11, steps 15, 16 and 17 are performed in the same manner as described in connection with FIG. 3. However, step 18 of the flow diagram of FIG. 3 is modified so that the locations $Z_2$–$Z_5$ of the centers of gravity are calculated in a different manner. In particular, the values of the centers of gravity are calculated in step 18', FIG. 11, by obtaining centers of gravity $Z'_1$ and $Z'_6$ by assuming that the resultant centers of gravity subsist between vectors $U_2$ and $U_3$ and between $U_4$ and $U_5$. In particular, the center of gravity positions $Z'_1$ and $Z'_6$ of the resultant centers of gravity $U_2$ and $U_3$ are given by:

$$Z_1' = \frac{u_2 Z_2 + u_3 Z_3}{u_2 + u_3}$$

$$Z_6' = \frac{u_4 Z_4 + u_5 Z_5}{u_4 + u_5}$$

In the FIG. 4 program, the residual unbalanced weights $U_7$ and $U_8$ are calculated in step 19, based upon the data obtained during step 18', in exactly the same manner that the values of $U_7$ and $U_8$ are derived in the flow diagram of FIG. 3. In addition, steps 20–22 are performed in the program of FIG. 11 in the same manner as the corresponding steps of FIG. 3. However, the new initial unbalanced weights determined in step 23 of FIG. 3 are determined by using a correcting plane converting step 23' in FIG. 11. In step 23', the initial unbalanced vectors $U_1(u_1, \theta_1)$ and $U_6(u_6, \theta_6)$ in correcting planes $Z_1$ and $Z_6$ are converted into initial unbalanced vectors $U''_1(u''_1, \theta_1)$ and $U_6(u''_6, \theta'_6)$ at Z ordinates $Z = Z'_1$ and $Z = Z'_6$. The values of $Z'_1$ and $Z'_6$ are obtained in step 18! for calculating center of gravity positions. The formulas for performing the conversion are derived from the formulas for dynamic balance. According to these forumlas:

Resultant unbalance $= U_1 + U_6 = U''_1 + U''_6$

Resultant moment $= Z_1 U_1 + Z_6 U_6 = Z'_1 U''_1 + Z'_6 U''_6$

From the resultant unbalance and resultant moment formulas involving $U''_1$, $U''_6$, $Z'_1$, and $Z'_6$, the values of $U''_1$ and $U''_6$ are given by:

$$U_1'' = \frac{(Z_6' - Z_1)U_1 - (Z_6 - Z_6')U_6}{Z_6' - Z_1'}$$

-continued
$$U_6'' = \frac{-(Z_1' - Z_1)U_1 + (Z_6 - Z_1')U_6}{Z_6' - Z_1'}$$

The values of $U''_1$ and $U''_6$, after having been calculated, are stored in the memory location where the values of $U_1$ and $U_6$ were previously stored and a do over loop is entered, causing step 16 to be repeated with the new values of $U_1$ and $U_6$. Then steps 17, 18', 19 and 20 are repeated, so that each of the correcting planes indicating dynamic unbalance closely approaches the center of gravity position of the corrected machining weight. As a result, it is possible to cancel the so-called correcting plane errors and machining data, fulfill the conditions of step 20; the values are read out during step 22.

In the previously described embodiments of the present invention, rotor R is machined by means of a milling cutter, drill or the like, to remove a given amount or weight of material from the rotor. However, instead of removing a corrective amount or weight, a corresponding corrective amount may be added to rotor R. For instance, several holes may be axially made in the rotor in advance and corrective weights may fill in some of these holes to offset the unbalance. From the foregoing, it is to be understood that the solution for the corrective machining weight to provide dynamic balance for a rotor can be obtained by performing computer operations in such a manner that measurement and corrective machining are repeatedly simulated. Consequently, obtaining dynamic balance of a rotor, which has been difficult to attain with a high degree of accuracy previously, can be obtained with a relatively few simple steps in accordance with the present invention. The accuracy of the solution is sufficiently high for practical use. According to the present invention there is no need to repeatedly measure and machine the rotor because high balancing accuracy can be obtained by machining the rotor body once. The cost required for balancing work can thereby be reduced, while the cost of automatic correcting apparatus is also reduced.

While there have been described and illustrated several specific embodiments of the invention, it will be clear that variations in the details of the embodiments specifically illustrated and described may be made without departing from the true spirit and scope of the invention as defined in the appended claims. In the described embodiments the dynamic unbalance of a rigid rotor is corrected by machining the rotor in a direction parallel to the rotor axis by either subtracting or adding weights corresponding to a corrective weight in each of two predetermined planes to compensate initial unbalance vectors corresponding to correction angle directions and corrective weights in the two predetermined planes. Prior to performing the machining, the center of gravity position of a corrective machining weight is calculated to provide corrective machining in an axial direction. The corrected machining corresponds to the corrective weight. The initial unbalanced vectors in the two predetermined planes are converted into unbalanced vectors in new planes respectively including the centers of gravity of the corrective machining weights obtained in the calculating step. Corrective angular positions and corrective machining weights around the respective planes are obtained by repeatedly performing the calculating and converting steps.

We claim:

1. A method of correcting dynamic unbalance of a rotor by either adding or subtracting corrective weights by machining the rotor in an axial direction thereof, said rotor having an unbalanced weight with respect to an axis in the axial direction, comprising:
    (a) determining correcting positions and values for corrective machining weights in accordance with information relating to initial unbalanced weights in two predetermined correcting spaced apart parallel planes of the rotor, said planes being normal to the axial direction;
    (b) calculating the position of the center of gravity of each of said corrective machining weights by using said determined correcting positions and said determined corrective machining weights;
    (c) calculating the values of residual unbalanced weights which are located in said axial direction by using said determined correcting positions and said determined corrective machining weights;
    (d) detecting whether or not one or both of said calculated residual weights is within a given range;
    (e) calculating machining feed strokes respectively corresponding to said unbalanced weights only if both of said residual unbalanced weights are detected in step (d) to be within said given range;
    (f) if one or both of said residual unbalanced weights is detected in step (d) to be out of said given range repeating steps (a)–(e) such that said step (a) is executed by using new values for the initial unbalanced weights, the new values being obtained from said residual unbalanced weight and said initial unbalanced weights; and
    (g) machining said rotor to correct said dynamic unbalanced weights in accordance with said machining weights obtained from said step (e) and from said correcting positions obtained in step (a).

2. A method of correcting the dynamic unbalance of a rotor as claimed in claim 1, wherein each of said new initial unbalanced weights is obtained by adding a function of said residual unbalanced weight to said initial unbalanced weight.

3. A method of correcting the dynamic unbalance of a rotor as claimed in claim 1, wherein step (b) includes the step of calculating the location of each resultant center of gravity of two adjacent corrective vectors which are vector components of each of said initial unbalanced weights.

4. A method of correcting dynamic unbalance of a rotor by either adding or subtracting corrective weights by machining the rotor in an axial direction thereof, said rotor having an unbalanced weight with respect to an axis in the axial direction, comprising:
    (a) determining correcting positions and values for corrective machining weights in accordance with information relating to initial unbalanced weights in two predetermined correcting spaced apart parallel planes of the rotor, said planes being normal to axial direction;
    (b) calculating the position of the center of gravity of each of said corrective machining weights by using said determined correcting positions and said determined corrective machining weights;
    (c) calculating the values of residual unbalanced weights which are located in said axial direction by using said determined correcting positions and said determined corrective machining weights;
    (d) detecting whether or not one or both of said calculated residual weights is within a given range;

(e) calculating machining feed trokes respectively corresponding to said unbalanced weights only if both of said residual unbalanced weights are detected in step (d) to be within said given range;

(f) if one or both of said residual unbalanced weights is detected in step (d) to be out of said given range, repeating steps (a)–(e) such that said step (a) is executed by using newly set values for the initial unbalanced weights, said newly set initial unbalanced weights being obtained by assuming two new correcting planes each including the location of said center of gravity obtained in step (b) and by calculating information relating to the unbalance in the assumed planes for information relating to the location of said center of gravity of said corrective machining weights and from said initial unbalanced weights, said information relating to unbalance at the assumed planes being converted into information relating to said newly set initial unbalanced weights; and (g) machining said rotor to correct said dynamic unbalanced in accordance with said machining weights obtained from said step (e) and from said correcting positions obtained in step (a).

5. A method of correcting the dynamic unbalance of a rotor as claimed in claim 1 or 4, wherein said correcting positions are located along the circumference of said rotor at a given angle interval.

6. A method of correcting the dynamic unbalance of a rotor as claimed in claim 5, wherein each initial unbalanced weight is resolvable into a plurality of vectors located at said correcting position, each vector having a given angle so that said correcting positions and said corrective machining weights are respectively found.

* * * * *